(12) United States Patent
Dwyer et al.

(10) Patent No.: US 8,526,949 B2
(45) Date of Patent: Sep. 3, 2013

(54) SYSTEM AND METHOD FOR COMMUNICATING RADIO ACCESS TECHNOLOGY INFORMATION TO MOBILE STATIONS

(75) Inventors: Johanna Lisa Dwyer, Ottawa (CA); David Philip Hole, Southampton (GB); Richard Charles Burbidge, Hook (GB); Andrew Mark Earnshaw, Kanata (CA); Maiyuran Wijayanathan, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 81 days.

(21) Appl. No.: 12/773,080

(22) Filed: May 4, 2010

(65) Prior Publication Data

US 2010/0304749 A1 Dec. 2, 2010

Related U.S. Application Data

(60) Provisional application No. 61/175,427, filed on May 4, 2009.

(51) Int. Cl.
*H04W 4/00* (2009.01)
(52) U.S. Cl.
USPC ........ 455/435.2; 455/436; 455/437; 455/438; 455/439; 455/440
(58) Field of Classification Search
None
See application file for complete search history.

(56) References Cited

U.S. PATENT DOCUMENTS

| | | | |
|---|---|---|---|
| 2005/0202828 A1* | 9/2005 | Pecen et al. | 455/453 |
| 2007/0019575 A1 | 1/2007 | Shaheen | |
| 2007/0037577 A1* | 2/2007 | Dalsgaard et al. | 455/436 |
| 2007/0275717 A1 | 11/2007 | Edge et al. | |
| 2008/0176564 A1 | 7/2008 | Eerolainen | |
| 2008/0188215 A1 | 8/2008 | Bergstrom et al. | |
| 2008/0194235 A1* | 8/2008 | Dalsgaard et al. | 455/411 |
| 2009/0088160 A1 | 4/2009 | Pani et al. | |
| 2009/0141690 A1 | 6/2009 | Fan et al. | |
| 2009/0181676 A1 | 7/2009 | Lee et al. | |

(Continued)

FOREIGN PATENT DOCUMENTS

| | | |
|---|---|---|
| EP | 2040502 A1 | 3/2009 |
| WO | 2002093955 A1 | 11/2002 |

(Continued)

OTHER PUBLICATIONS

3GPP TS 23.272 v8.3.0; 3rd Generation Partnership Project; Technical Specification Group Services and System Aspects; Circuit Switched Fallback in Evolved Packet System; Stage 2; Release 8; Mar. 2009; 47 pgs.

(Continued)

*Primary Examiner* — Charles Shedrick
(74) *Attorney, Agent, or Firm* — Finnegan, Henderson, Farabow, Garrett & Dunner, LLP

(57) ABSTRACT

A mobile station incapable of communicating via a first radio access technology (RAT) and capable of communicating via a second radio access technology (RAT). The mobile station comprising a component configured to receive a list of neighbor cells of the second RAT. The list containing at least one identifying characteristic associated with at least one cell of the first RAT. A component configured to determine that the at least one identifying characteristic is associated with at least one cell of the first RAT.

9 Claims, 7 Drawing Sheets

(56) References Cited

U.S. PATENT DOCUMENTS

| | | | |
|---|---|---|---|
| 2009/0258671 | A1 | 10/2009 | Kekki et al. |
| 2009/0268635 | A1 | 10/2009 | Gallagher et al. |
| 2010/0074235 | A1 | 3/2010 | Sebire et al. |
| 2010/0234010 | A1* | 9/2010 | Fischer ................. 455/422.1 |
| 2010/0323663 | A1* | 12/2010 | Vikberg et al. ............ 455/410 |
| 2011/0014920 | A1* | 1/2011 | Nylander et al. .......... 455/442 |
| 2011/0039542 | A1 | 2/2011 | Sebire et al. |
| 2011/0077015 | A1 | 3/2011 | Saily et al. |
| 2011/0151913 | A1 | 6/2011 | Forster et al. |

FOREIGN PATENT DOCUMENTS

| | | |
|---|---|---|
| WO | 2008081315 A1 | 7/2008 |
| WO | 2009045070 A2 | 4/2009 |
| WO | 2009047477 A1 | 4/2009 |

OTHER PUBLICATIONS

3GPP TS 23.401 v9.0.0; 3rd Generation Partnership Project; Technical Specification Group Services and System Aspects; General Packet Radio Service (GPRS) Enhancements for Evolved Universal Terrestrial Radio Access Network; (E-UTRAN) access; Release 9; Mar. 2009; 225 pgs.
3GPP TS 36.101 v8.5.0; 3rd Generation Partnership Project; Technical Specification Group Radio Access Network; Evolved Universal Terrestrial Radio Access (E-UTRA); User Equipment (UE) Radio Transmission and Reception; Release 8; Mar. 2009; 121 pgs.
3GPP TS 36.331 v8.5.0; 3rd Generation Partnership Project; Technical Specification Group Radio Access Network; Evolved Universal Terrestrial Radio Access (E-UTRA); Radio Resource Control (RRC) Protocol Specification; Release 8; Mar. 2009; 204 pgs.
3GPP TS 44.018 v9.0.0; 3rd Generation Partnership Project; Technical Specification Group GSM/EDGE Radio Access Network; Mobile Radio Interface Layer 3 Specification; Radio Resource Control (RRC) Protocol; Release 9; Feb. 2009; 421 pgs.
3GPP TS 44.060 v8.4.0; 3rd Generation Partnership Project; Technical Specification Group GSM/EDGE Radio Access Network; General Packet Radio Service (GPRS); Mobile Station (MS) - Base Station System (BSS) Interface; Radio Link Control/Medium Access Control (RLC/MAC) Protocol; Release 8; Feb. 2009; 589 pgs.
3GPP TS 45.005 v8.4.0; 3rd Generation Partnership Project; Technical Specification Group GSM/EDGE; Radio Access Network; Radio Transmission and Reception; Release 8; Feb. 2009; 184 pgs.
3GPP TS 45.008 v8.2.0; 3rd Generation Partnership Project; Technical Specification Group GSM/EDGE Radio Access Network; Radio Subsystem Link Control; Release 8; Feb. 2009; 137 pgs.
3GPP TS 43.318 v8.3.0; 3rd Generation Partnership Project; Technical Specification Group GSM/EDGE Radio Access Network; Generic Access Network (GAN) Stage 2; Release 8; Aug. 2008; 127 pgs.
Dwyer, Johanna L., et al.; U.S. Appl. No. 12/435,357, filed May 4, 2009; Title: Systems and Methods for Mobile Stations to Identify Radio Access Technologies.
Dwyer, Johanna L., et al.; U.S. Appl. No. 12/435,358, filed May 4, 2009; Title: Identifying Radio Access Technology Characteristics to Mobile Stations System and Method.
Dwyer, Johanna L., et al.; U.S. Appl. No. 12/435,362, filed May 4, 2009; Title: Indicating Radio Access Technology Information to Mobile Stations System and Method.
3GPP TS 23.401v8.5.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Mar. 2009; 223 pgs.
3GPP TS 36.101v8.5.1; 3rd Generation Partnership Project; Technical Specification Group Radio Access Network; Evolved Universal Terrestrial Radio Access (E-UTRA); User Equipment (UE) Radio Transmission and Reception; Release 8; Mar. 2009; 121 pgs.
3GPP TS 44.018v8.6.0; 3rd Generation Partnership Project; Technical Specification Group GSM/EDGE Radio Access Network; Mobile Radio Interface Layer 3 Specification; Radio Resource Control (RRC) Protocol; Release 8; Feb. 2009; 421 pgs.
Motorola; 3GPP TSG-SA WG2 Meeting #63; Title: Handover with Network Discovery and Selection; Change Request; S2-081410; Athens, Greece; Feb. 18-22, 2008; 2 pgs.
Nokia Corporation, et al.; 3GPP TSG GERAN#37; Title: Handling Neighbour Cell Lists for E-UTRAN; Tdoc GP-080167; Seoul, South Korea, Feb. 2008; 7 pgs.
Nokia, et al.; 3GPP TSG GERAN#36; Title: Cell Identities for Inter-RAT Monitoring; GP-071686; Vancouver, Canada; Nov. 12-16, 2007; 8 pgs.
Research in Motion UK Limited, et al.; 3GPP TSG GERAN#42; Title: GERANn LTE Interworking Issues with Legacy Systems; TDoc GP-090887; Shenzhen, P.R. China; May 11-15, 2009; 3 pgs.
T-Mobile, et al.; 3GPP TSG-RAN2 Meeting #64; Title: Proposed CR to 36.300 [Rel-8] on Support of UE Autonomous Search for E-UTRAN CSG Cells When Camped on a RAT Other than E-UTRAN; R2-086093; Prague, Czech Republic; Nov. 10-14, 2008; 4 pgs.
European Search and Examination Report; EP Application No. 09175400.2-2412; Feb. 17, 2010; 10 pgs.
European Search and Examination Report; Ep Application No. 09175406.9-2412; Feb. 19, 2010; 8 pgs.
European Search and Examination Report; Ep Application No. 09175399.6-2412; Jan. 27, 2010; 10 pgs.
PCT International Search Report; PCT Application No. PCT/CA2010/000650; Filed Jan. 28, 2010; Mailed Aug. 11, 2010; 3 pgs.
PCT Written Opinion of the International Searching Authority; PCT Application No. PCT/CA2010/000650; Filed Jan. 28, 2010; Mailed Aug. 11, 2010; 3 pgs.
PCT International Search Report; PCT Application No. PCT/CA2010/000651; Filed May 4, 2010; Mailed Jul. 8, 2010; 3 pgs.
PCT Written Opinion of the International Searching Authority; PCT Application No. PCT/CA2010/000651; Filed May 4, 2010; Mailed Jul. 8, 2010; 3 pgs.
PCT International Search Report; PCT Application No. PCT/CA2010/000652; Filed May 4, 2010; Mailed Jul. 8, 2010; 3 pgs.
PCT Written Opinion of the International Searching Authority; PCT Application No. PCT/CA2010/000652; Filed May 4, 2010; Mailed Jul. 8, 2010; 3 pgs.
PCT International Search Report; PCT Application No. PCT/GB2010/000898; Filed May 4, 2010; Mailed Aug. 6, 2010; 4 pgs.
PCT Written Opinion of the International Searching Authority; PCT Application No. PCT/GB2010/000898; Filed May 4, 2010; Mailed Aug. 6, 2010; 10 pgs.
Office Action dated Nov. 25, 2011 in copending U.S. Appl. No. 12/435,362, filed May 4, 2009, 21 pages.
Office Action dated Sep. 30, 2011 in copending U.S. Appl. No. 12/435,358, filed May 4, 2009, 23 pages.
Communication dated Aug. 7, 2012 in copending EP Application No. 10718260.2-2414, 4 pgs.
Advisory Action dated May 17, 2012 in copending U.S. Appl. No. 12/435,358, filed May 4, 2007, 5 pages.
Office Action dated Feb. 23, 2012 in copending U.S. Appl. No. 12/435,362, filed May 4, 2009, 15 pages.
Office Action dated Mar. 26, 2012 in copending U.S. Appl. No. 12/773,080, filed May 4, 2012, 13 pages.
Office Action dated Feb. 10, 2012 in copending U.S. Appl. No. 12/435,358, filed May 4, 2007, 13 pages.
Office Action dated Mar. 1, 2012 in copending U.S. Appl. No. 12/435,357, filed May 4, 2009, 19 pages.
Patent Examination Report No. 1 for Australian Patent Application No. 2010244925, issued May 17, 2013, 5 pages.

\* cited by examiner

US 8,526,949 B2

SYSTEM AND METHOD FOR COMMUNICATING RADIO ACCESS TECHNOLOGY INFORMATION TO MOBILE STATIONS

CROSS-REFERENCE TO RELATED APPLICATIONS

The present application claims priority to U.S. provisional patent application No. 61/175,427 filed May 4, 2009, by Johanna L. Dwyer, et al, entitled "System and Method for Communicating Radio Access Technology Information to Mobile Stations", now expired, which is incorporated by reference herein as if reproduced in its entirety.

BACKGROUND

As used herein, the terms "mobile station" ("MS") and "user equipment" ("UE") might in some cases refer to mobile devices such as mobile telephones, personal digital assistants, handheld or laptop computers, and similar devices that have telecommunications capabilities. Such a MS might consist of a MS and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. As used herein, the term "SIM" may also refer to "USIM" and the term "USIM" may also refer to "SIM." Alternatively, such a MS might consist of the device itself without such a module. In other cases, the term "MS" might refer to devices that have similar capabilities but that are not transportable, such as desktop computers, set-top boxes, or network appliances. The term "MS" can also refer to any hardware or software component that can terminate a communication session for a user. Also, the terms "MS," "UE," "user agent" ("UA"), "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station.

As used herein, the term "access node" will refer to any component of the wireless network, such as a traditional base station, a wireless access point, or an LTE eNB, that creates a geographical area of reception and transmission coverage allowing a MS or a relay node to access other components in a telecommunications system. In this document, the term "access node" may comprise a plurality of hardware and software. An access node, core network component, or other device, may provide wireless communications resources in an area known as a cell.

An LTE system can include protocols such as a Radio Resource Control (RRC) protocol, which is responsible for the assignment, configuration, and release of radio resources between a MS and an access node or relay node or other LTE equipment. The RRC protocol is described in detail in the Third Generation Partnership Project (3GPP) Technical Specification (TS) 36.331.

The signals that carry data between MSs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each MS or other network node with which it is communicating at any particular time.

Different types of radio access technologies (RATs) have been developed and used. An example of a RAT is a "GERAN," which is "GSM/EDGE" radio access network. "GSM" is "global system for mobile communications." "EDGE" is "Enhanced Data Rates for GSM Evolution," which is a type of wireless communication network. As used herein, the term "GERAN" may be read to include UTRAN. "UTRAN" is "universal terrestrial radio access network."

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
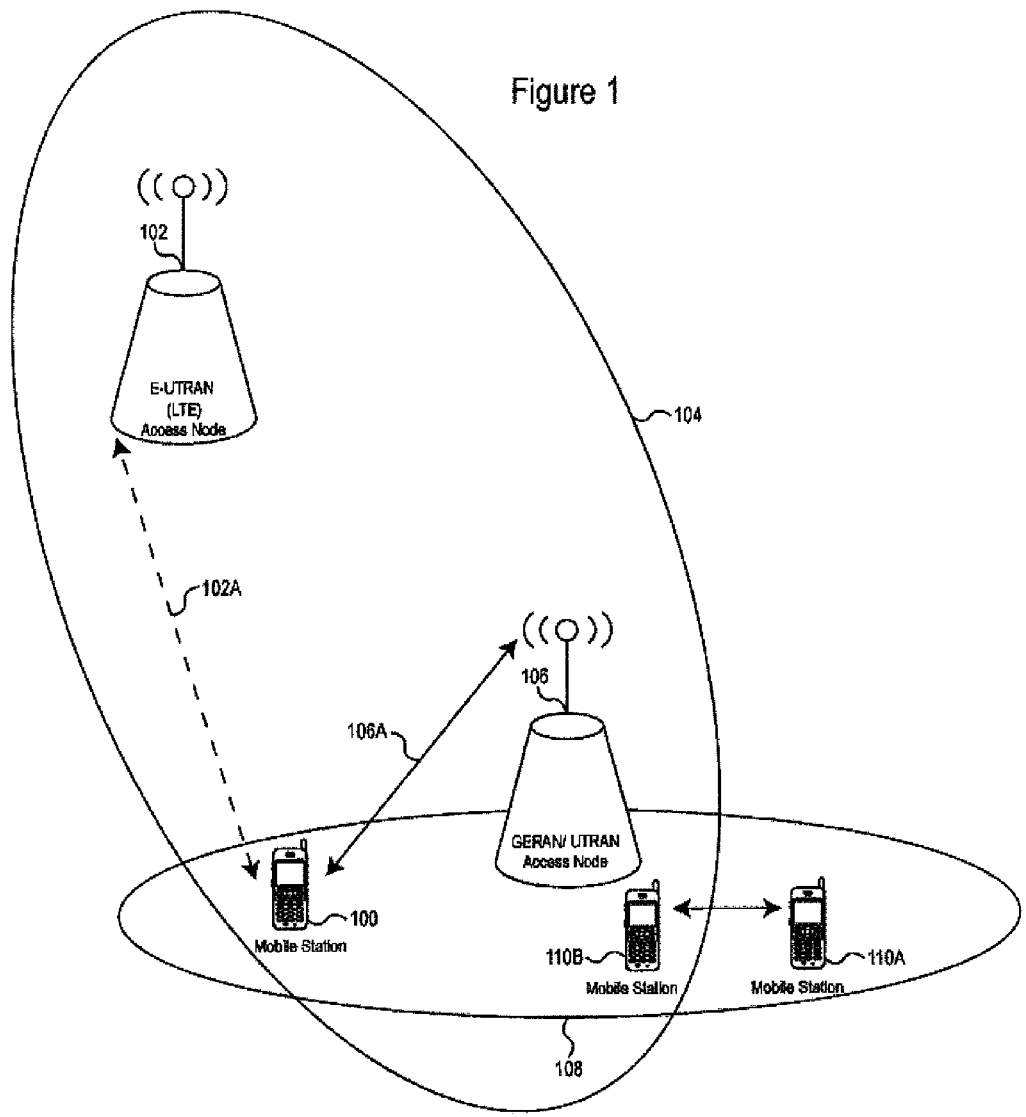
FIG. 1 is a diagram illustrating a wireless communication system, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, the following acronyms have the following definitions.

"AS" is defined as "access stratum," which comprises one or more radio access and/or radio management layers in a protocol stack in a MS or radio access network (RAN).

"ARFCN" is defined as "absolute radio frequency channel number," which is a number that identifies a mobile communications frequency, and may be used to identify a mobile communications cell when referring to the ARFCN of the BCCH carrier of a cell.

"BCCH" is "broadcast control channel," which is a mobile communications resource.

"BSC" is "base station controller."

"BSS" is "base station subsystem."

"BTS" is "base transceiver station."

"CCO" is "cell change order."

"CN" is defined as "core network," which refers to devices and software for processing messages and data from MSs (mobile stations), sent through radio access networks (RANs).

"CS" is defined as "circuit switched," which refers to a conventional procedure for communicating a phone call or for connecting devices for data transfer over a permanent or semi-permanent radio connection, such as, for example, a telephony line.

"CSFB" is defined as "CS fallback," which refers to a procedure in which, when implementing a communication, an evolved packet system (EPS) enabled device "falls back" to a circuit switched (CS) communication procedure.

"DL" is "downlink"

"DLDC" is "downlink dual carrier."

"DTM" is "dual transfer mode."

"EARFCN" is defined as the E-UTRAN absolute radio frequency channel number, which refers to a number that identifies a frequency in an E-UTRAN wireless communication network.

"eNB," as defined above, is an "enhanced node B," which is an example of one type of device used in a radio access network (RAN) to aid in establishing communication between a MS and a CN.

"EPC" is defined as "evolved packet core," which refers to the core network (CN) to which a long term evolution (LTE) radio network communicates.

"EPS" is defined as "evolved packet system," which refers to the EPC and a set of access systems—EPS represents the system that may have the E-UTRAN as a radio network, and the EPC as its core network.

"E-UTRAN," is defined as "evolved UTRAN," which refers to "evolved UMTS terrestrial RAN," which in turn refers to, "evolved universal mobile telecommunications system terrestrial radio access network;" E-UTRAN refers to the network of "e-NBs" ("enhanced node-Bs") in a long term evolution (LTE) communications system. As used herein, the terms "E-UTRAN" and "LTE" may be used interchangeably.

"GPRS" is "general packet radio service," which is a system used by GSM MSs.

"IMS" is "IP (Internet protocol) multimedia subsystem."

"LAU" is "location area update."

"LTE" is defined as "long term evolution," which refers to a newer system of high speed mobile communications and infrastructure.

"NAS" is defined as "non-access stratum," which is a layer in a protocol stack in both a MS and a core network (CN), but may not be in a protocol stack of a radio access network (RAN).

"MAC" is defined as "medium access control," which is a protocol layer in a MS, and RAN.

"MME" is "mobility management entity."

"MO data" is defined as "mobile originating data," which is a type of establishment cause used in EPS-enabled systems.

"MO signaling" is defined as "mobile originating signaling."

"MS" is "mobile station."

"MSC" is "mobile switching center."

"MT access" is defined as "mobile terminating access."

"NACC" is "network assisted cell change.", which is a method of providing system information corresponding to a second cell to a MS in a first cell "NCL" is "neighbour cell list."

"NMO" is "network mode of operation."

"NPM" is "non-persistent mode."

"PCI" is "physical cell identity."

"PLMN" is "public land mobile network."

"PS" is "packet switched."

"RA" is "routing area."

"RAN" is defined as "radio access network."

"RAT" is "radio access technology," examples of which include GSM, EDGE, E-UTRAN, UMTS, and LTE.

"RAU" is "routing area update."

"RLC" is "radio link control."

"RR" is "radio resource."

"RRC" is "radio resource control."

"RTTI" is "reduced transmission time interval," which is part of a GERAN latency reduction feature.

"S-GW" is "signaling gateway".

"TAU" is "tracking area update."

"TBF" is "temporary block flow."

"TCP" is "transmission control protocol."

"TS" is defined as "technical specifications," which are mobile communications specifications called-for by the 3GPP ($3^{rd}$ generation partnership project).

"UL" is "uplink".

"USF" is "uplink state flag."

"TDMA" is "time division multiple access."

Other acronyms that may appear herein are used and defined according to the technical specifications of the 3GPP standards.

The embodiments described herein provide for devices and methods for allowing a MS to overcome being constrained. "Constrained" is defined as a situation in which a MS, either in idle mode or active mode, that is enabled to communicate in both a first radio access technology system and a second radio access technology system, and that is being served by a mobile communication cell of the second RAT, but the MS is unable, for whatever reason, to connect to a mobile communication cell of the first RAT that is otherwise available to the MS. An example of a MS being constrained includes a MS being unaware of the presence of a cell, even if potential reception of the cell is good. In an embodiment, an E_UTRAN-capable MS can become constrained on a GERAN cell, even though the MS preferably should be connected to an E-UTRAN cell, and the coverage of the E-UTRAN cell overlaps that of the GERAN cell.

As a non-limiting summary of the above definition, an E-UTRAN-capable MS is "constrained" if the MS is connected to a GERAN network, but is unable to connect to an otherwise available E-UTRA network. A MS is said to be "unconstrained" for those situations in which a MS overcomes being constrained, and is thus able to reselect to the E-UTRA network.

Specifically, the embodiments provide for the MS performing an undirected attempt to identify one or more E-UTRAN cells. In some embodiments, the undirected search might be performed according to the procedures and/or rules described herein. The term "undirected searching" refers to a MS wirelessly searching for a resource of a network, or for a particular access node or base station, without having received any prior identification or knowledge of the existence of such a network, access node, or base station by means of a neighbour cell list specified primarily for the indicating the presence of such network, access node, or base station. The purpose of the process of searching is to identify a cell. The identification of a cell may be done by recognition of a specific physical layer aspect of the network transmission, by the recognition of specific control channels or beacons design for this purpose, or by explicitly reading a field which identifies the cell as belonging to a specific network. For example in E-UTRAN if the MS knows the center frequency it attempts to detect the primary and secondary synchronization signals. The combination of primary and secondary synchronization signals gives the MS the physical cell ID (PCI) which is locally unique. The MS can then read the system information to obtain a CGI (cell global identity). Only detection of the locally unique PCI is required for cell reselection and measurement purposes. If the MS does not know the centre frequency it must attempt to perform the above synchronization process on every potential center frequency on a 100 kHz raster within the frequency bands supported by the UE. The UE might do some wideband RSSI measurement to judge if there is any RF energy before attempting the synchronization process on a given center frequency to minimize the searching time but this is implementation specific.

The MS might be required to perform an undirected search only if the MS receives permission to attempt to identify an E-UTRAN cell. Additionally, the MS might be required to perform a subsequent cell reselection upon receiving permission. Permission for conducting an undirected search and permission for cell reselection may be provided according to a number of different techniques, as described further below.

The embodiments allow a MS to reselect a cell, even though such reselection might not be possible according to existing reselection rules. MS reselection might not be possible because, under existing reselection rules, the neighbour cell list of a serving cell might not list an E-UTRAN cell, or its center frequency. Having the MS conduct the search and subsequently reselect to the E-UTRAN cell reduces the need for operators to ensure that all network equipment is upgraded or fully updated when adding E-UTRAN coverage to a geographical area, while still providing a good user experience by allowing the user to more easily take advantage of high-bandwidth E-UTRAN networks.

In the embodiments described above and below, the permissions and/or MS behavior to be specified might be directly in response to explicit signaling. These permissions need not necessarily be transmitted and/or received, but may be based on rules stored in the MS, as is the case currently for reselection rules. In other words, there may be rules detailed in the 3GPP standards which trigger the MS to conduct an undirected search and/or to reselect an E-UTRAN cell.

While the embodiments are described with respect to particular types of radio access technologies (RATs), such as GERAN, UTRAN, and E-UTRAN, the embodiments may also apply to other kinds of wireless communication networks. Therefore, the embodiments apply to MSs that might become constrained on a first network when the MSs should or could connect to an otherwise available second network.

FIG. 1 is a diagram illustrating a wireless communication system, according to an embodiment of the disclosure. FIG. 1 shows a MS 100, which could be system 715 of FIG. 7. The MSs described herein are operable for implementing aspects of the disclosure, but the disclosure should not be limited to these implementations. Though illustrated as a mobile phone, the MSs may take various forms including wireless handsets, a pager, personal digital assistants (PDAs), portable computers, tablet computers, or laptop computers. Many suitable devices combine some or all of these functions. In some embodiments of the disclosure, the MSs are not general purpose computing devices like portables, laptops or tablet computers, but rather are special-purpose communications devices, such as mobile phones, wireless handsets, pagers, or PDAs. In other embodiments, MSs may be portable, laptops, or other computing devices.

Among the various applications executable by the MSs are web browsers, which enable displays to show web pages. Web pages may be obtained via wireless communications with wireless network access nodes, cell towers, peer MSs, or any other wireless communication network or systems. Networks may be coupled to wired networks, such as the Internet. Via a wireless link and a wired network, MSs may have access to information on various servers. Servers may provide content that may be shown on the displays. Alternately, MSs may access networks through peer MSs acting as intermediaries, in relay type or hop type connections.

MS 100 is capable of communicating with both an E-UTRAN access node 102 (as shown by arrows 102A), and with a GERAN/UTRAN access node 106, as shown by arrows 106A. E-UTRAN access node 102 provides wireless communication resources in E-UTRAN cell 104, and the GERAN/UTRAN access node 106 provides wireless communication resources in a GERAN or UTRAN cell 108. Although in the embodiments E-UTRAN access node 102 establishes an E-UTRAN network, E-UTRAN access node 102 may represent any LTE access node and corresponding LTE cell. Likewise, although in the embodiments GERAN/UTRAN access node 106 establishes a GERAN or UTRAN network, GERAN/UTRAN access node 106 may represent any non-LTE access node and corresponding non-LTE cell.

In an embodiment, MS 100 may find itself being served by GERAN cell 108, but that cell does not indicate the presence of E-UTRAN cell 104 or other E-UTRAN cells in the neighbourhood of GERAN cell 108. MS 100 should be able to connect to E-UTRAN access node 102 because MS 100 is in both E-UTRAN cell 104 and GERAN cell 108, and further because MS 100 is an E-UTRAN-capable device.

However, the MS may be unable to select the E-UTRAN cell because the reselection and measurement procedures may only allow for the MS to reselect cells which are indicated by a neighbour cell list of the current (serving) cell. Presently, the MS may not be permitted to reselect an E-UTRAN cell if the serving cell, such as a legacy access node, has not been upgraded or updated to indicate the presence of E-UTRAN neighbour cells. In other words, an LTE-capable MS can become constrained on a GERAN cell, even though the MS preferably should be connected to an E-UTRAN cell that overlaps the GERAN cell. This situation is undesirable because E-UTRAN access node 102 may be able to provide higher peak data rates or significantly lower latency relative to that which can be provided by GERAN/UTRAN access node 106.

An example of a situation in which MS 100 may become constrained is after the MS 100 is involved in a CS fallback communication. A CS fallback communication can occur in situations in which E-UTRAN access node 102 is incapable of handling a certain kind of communication, such as a voice communication, or generally in situations in which a GERAN/UTRAN access node 106 is better able to or otherwise should handle a particular communication. In this case, the MS 100 which was previously served by E-UTRAN cell 104 instead "falls back" to use GERAN/UTRAN access node 106 for that particular communication. The CS fallback communication procedure is described more fully with respect to FIG. 6 and is described in detail in 3GPP TS 23.272.

Another situation in which MS 100 may become constrained is when the MS 100 moves from a physical location in which MS 100 is only within GERAN cell 108 to a second physical location in which the MS 100 is within both E-UTRAN cell 104 and GERAN cell 108. This situation is shown by MS 110A and MS 110B, the movement of which is shown by the arrow between them. Once MS 110B is within both E-UTRAN cell 104 and GERAN cell 108, MS 110B should be able to connect to E-UTRAN access node 102, but instead may be constrained because presently the MS is unaware of the E-UTRAN cell 104 based on information provided to it by its serving GERAN/UTRAN access node 106.

Yet another situation in which MS 100 may become constrained is where a network node, such as E-UTRAN access node 102 or E-UTRAN cell 104 or possibly GERAN cell 108, transmits a neighbour cell list that is incomplete. For example, one or more cells which could provide a service to MS 100 are omitted from the neighbour cell list.

Still further, a MS which is being served by GERAN/UTRAN access node 106, but which observes that there are no E-UTRAN frequencies listed in the neighbour cell list sent by the GERAN/UTRAN access node 106, cannot determine whether the lack of such frequencies is due to the GERAN/UTRAN access node 106 being a release-7 or earlier version (and therefore not supporting E-UTRAN frequencies in the neighbour cell list), or because no such frequencies exist, or for some other reason, such as if the GERAN/UTRAN access node 106 is a release-8 or newer version but not yet configured to list E-UTRAN neighbour cells. A release-7 or earlier GERAN access node currently does not list the frequencies of neighbour E-UTRAN cells, whereas a release-8 or newer GERAN access node is so capable if it has received the appropriate upgrade and configuration.

As indicated above, release-8 and newer GERAN/UTRAN base stations have the capability to be aware of E-UTRAN by maintaining an E-UTRAN neighbour cell list. These stations may send this information to the MS. However, older GERAN/UTRAN base stations may not be able to assist the MS with any information about E-UTRAN neighbour cells to measure for reselection. E-UTRAN cells may be identified by EARFCN and PCI. The E-UTRAN neighbour cell information may include information such as carrier frequencies identified by EARFCN, in which case the MS can consider that any cell identified on that carrier frequency (and not explicitly indicated as a not allowed cell) is a candidate for reselection.

Additional situations can arise in which MS 100 or MS 110B become constrained. However the MS becomes constrained, the problem of being constrained has at least two aspects. In a first aspect, if the MS is being served by a GERAN/UTRAN cell and is not aware of the presence of E-UTRAN neighbour cells, the MS should have some basis for determining whether to attempt to identify E-UTRAN cells. In a second aspect, once the MS has searched for E-UTRAN neighbour cells, the MS should have some basis for determining whether to reselect to an E-UTRAN cell. Preferably, for both aspects, the network operator should have at least some control over the behavior of the MS.

While a constrained MS might be able to autonomously determine when to attempt to identify and reselect to an E-UTRAN cell, this solution may not be preferred because the operator might desire to have some degree of control over MSs switching from one cell to another. Additionally, a MS that autonomously searches for E-UTRAN cells may undesirably drain MS battery power, particularly in those cases where an E-UTRAN cell may not be available.

The present disclosure provides embodiments for allowing a MS to overcome being constrained. Specifically, the embodiments provide for the MS performing an undirected or directed attempt to identify one or more E-UTRAN cells according to various procedures described herein. For example, the MS may perform an undirected search if the MS receives permission to attempt to identify any E-UTRAN frequency or cell. Alternatively, the MS may perform a directed search if the MS receives permission to attempt to identify a specific E-UTRAN frequency or cell. Additionally, the MS may perform a subsequent cell reselection upon receiving permission. Permission for conducting an undirected or directed search and permission for cell reselection may be provided according to a number of different techniques, described below. As defined above, the term "undirected searching" refers to a MS wirelessly searching for a resource of a network, or for a particular access node or base station, without having received any prior identification or knowledge of the existence of such a network, access node, or base station by means of a neighbour cell list specified primarily for the indicating the presence of such network, access node, or base station.

The term "directed searching" refers to a MS wirelessly searching for a resource of a network, or for a particular access node or base station, having received some identification or knowledge of the existence of such a network, access node, or base station by means of one or more unused GERAN/UTRAN cell identities which the MS and the network have associated with one or more E-UTRAN frequencies or cell identities, however this knowledge of the existence of such a network, access node, or base station is not received via a neighbour cell list specified primarily for the indicating the presence of such network, access node, or base station.

Permission to Perform Undirected or Directed Searching:

A variety of rules and/or indications may be used to determine when the MS is to perform an undirected or directed attempt to identify E-UTRAN cells. The following rules may be combined into a variety of combinations of rules. Some of the following rules are intrinsic to the MS. Some of the following rules are transmitted at some point by the access node to the MS. Transmitted rules may be transmitted in broadcast signaling, such as in system information messages or system information blocks, or may be transmitted by means of point-to-point messages, such as a packet measurement order. However, transmitted, received, or stored, the rules are not necessarily static, but could change. Furthermore different rules could be transmitted by the access node to the MS in all of various types of signaling (broadcast, multicast, point-to-point, etc.), as well as via an OMA DM (open mobile alliance device management) object or via NAS signaling, etc. Thus, the operator may have the ability to, at any time, change the rules for undirected or directed searching and for reselection.

An example of a rule might be that permission to perform undirected or directed searching may be signaled by a previous serving E-UTRAN cell. In this case, an E-UTRAN cell in which a MS has been previously camped may explicitly signal that the MS is permitted to perform undirected searching when the MS is constrained. The E-UTRAN cell may also indicate one or more E-UTRAN frequencies to assist (i.e. direct) the MS in performing the search.

Another example of a rule is that permission to perform undirected or directed searching may be signaled by a GERAN cell. A release-8 or newer GERAN cell in which a MS has been previously camped, or in which the MS is currently camped, may explicitly signal that the MS is allowed to perform an undirected or directed search. This indication may include an indication which does not require release-8 or later functionality associated with the E-UTRAN interworking in the GERAN cell. For example, the GERAN BSS (such as GERAN/UTRAN access node 106) may provide a cell identity that references a GERAN cell that does not actually exist. This cell identity is known to the MS to correspond to one or more E-UTRAN frequencies. Thus, the MS knows that the MS may be within coverage of one or more E-UTRAN cells, and that the MS may perform undirected or directed searching. When used by a release-8 or newer GERAN BSS, this indication may allow the MS to distinguish between the case where there may be E-UTRAN coverage in the neighbourhood, but the BSS has not been configured to transmit the information, and the case where the BSS is configured to indicate explicitly that there is no E-UTRAN coverage in the neighbourhood.

Yet another example of a rule is that permission to perform directed searching may be indicated by the GERAN/UTRAN access node 106 sending a PACKET CELL CHANGE ORDER message to the MS. This message indicates a cell identity that references a GERAN cell that does not actually exist (e.g. a "E-UTRAN-indicative" ARFCN), which the MS would identify as an "equivalent EARFCN" from mapping information obtained in a manner described below with respect to mapping of E-UTRAN-indicative ARFCN to E-UTRAN frequencies. In another embodiment of permission to perform an undirected search, permission in the form of one or more cell identities that reference GERAN cells that do not actually exist (e.g. "E-UTRAN-indicative ARFCNs") that might not be mapped to one or more E-UTRAN frequencies, but may instead provide the permissions to conduct an undirected attempt to identify an E-UTRAN cell, to reselect an E-UTRAN cell, or both.

In still another example of a rule, permission to perform undirected searching may be based on dedicated priorities previously received by the MS. For example, the MS may have previously received dedicated priority information which includes a priority for one or more E-UTRAN frequencies. Examples of dedicated priority information may be found in sub-clause 12.50 in 3GPP TS 44.060 version 8.4.0. Based on this information, the MS may determine whether or not the MS is permitted to attempt to identify E-UTRAN cells.

Another example of a rule is that permission to perform undirected searching may be based on the use of a CS fallback procedure. In this example, the MS performs undirected searches for E-UTRAN cells in any case where the MS has terminated a voice call or other CS domain service which was initiated by means of a CS fallback procedure. Generally, this rule may be used where the original change of radio access technology (RAT) was specifically for the purpose of using CS domain services.

Yet another example of a rule is that permission to perform undirected searching may be based on mobility and/or cell changes. In this case, the MS determines whether to perform undirected searching based on the number of cell changes since the MS was last served by an E-UTRAN cell. For example, the MS may perform undirected searching only if the MS is currently being served by the same cell that served the MS when the MS first left E-UTRAN service. Alternatively, the MS may perform undirected searching only if the MS remains within the same location area or routing area as when the MS initially left E-UTRAN service. Alternatively, the MS may perform undirected searching only if the MS remains within the same PLMN as when the MS initially left E-UTRAN service. Alternatively, the MS may perform undirected searching only if the MS has moved a predetermined (or fewer) number of GERAN cells since leaving an E-UTRAN service.

In still another example of a rule is that permission to perform undirected searching may be based on NAS signaling. The network communicates whether the MS may perform undirected searching by means of non-access stratum (NAS) signaling. NAS signaling is described in more detail with respect to FIG. 6. For example, during a routing area update (RAU) procedure, tracking area update (TAU) procedure, combined attach procedure, or some other use of the NAS, the CN may provide additional data to the MS that permits the MS to perform undirected searching.

An additional example of a rule is that permission to perform undirected searching may be provided during provisioning or during over-the-air updates. In this embodiment, permission to perform undirected searching is stored in the MS, either in the USIM, SIM, or in some other memory of the MS. This permission may be set by the operator during provisioning, or may be communicated to the MS via over-the-air (OTA) updates. Once the permission is active, the MS subsequently has permission to perform undirected searching.

In yet another embodiment, permission to perform undirected searching may be defined by user preference, or may be user-initiated. In this case, the MS determines whether to perform undirected searching based on one or more inputs by the user. The user-defined rule or rules to perform undirected searching can be further refined according to time, geographical location, operator input, application(s) in use, other factors, or combinations thereof.

In another embodiment, permission to perform undirected searching may be based on voice service availability in E-UTRAN. In this case, the MS may take into account the success or failure of previous attempts to perform a combined attach procedure in an EPS. For example, the MS may not perform an undirected search in the case where the MS failed its most recent attempt to perform the combined attach procedure in EPS (which is a prerequisite for the CS fallback procedure). On the other hand, the MS may perform undirected searching if the most recent combined attach procedure was successful.

In still another embodiment, permission to perform undirected searching may be based on IMS/CSFB preference and/or the support of these features in the MS and/or the network. In this case, the MS takes account of its capability and/or preference for initiating voice services while served by an E-UTRAN network using IMS and/or by means of CSFB (CS fallback). For example, a MS which prefers, or is only capable of, initiating voice communication by means of CSFB may prefer to remain camped on a GERAN or other non-E-UTRAN cell. In this case, the MS may not perform undirected searching. Alternatively, a MS which is capable of IMS voice communication may perform undirected searching.

A number of considerations should be taken into account when performing undirected searches. In an embodiment, because the number of operating E-UTRAN frequency division duplex (FDD) bands in 3GPP TS 36.101 is about 20, and the MS may support multiple operating E-UTRA bands, an unrestricted undirected attempt to identify E-UTRAN frequencies may impact MS battery life and increase cell selection or reselection time. Within a PLMN, there could be a fixed number of operating E-UTRAN bands or within a certain area corresponding to a list of TAs, the number of available E-UTRAN frequencies is limited. Therefore, in the case where change of serving cell away from E-UTRAN is directed by the network, the frequencies to search may be limited, for example to those indicated by the corresponding mobility command or the system information transmitted from the E-UTRAN cell which served the MS before the serving cell change. For example, a MobilityfromEUTRAN- Command message can be extended to include a set of E-UTRA frequencies. The MS stores and uses them for attempting to identify E-UTRAN cells. The MS may use the stored E-UTRAN frequencies received in the System Information Block Type 5 for the undirected or directed searches. The MS may store and use the E-UTRA frequencies in the existing IdleModeMobilityControlInfo IE (information element) indicated by the RRC Connection Release message for the undirected or directed searches.

In the particular case of a CSFB procedure, in some CSFB situations, there may be a call back immediately after the termination of the original CSFB call. In order to avoid rapidly alternating between E-UTRAN and the CS-supporting RATs, a timer may be started by the MS (whether it is indicated or not by the network is optional). The timer starts upon completion of a CSFB call. The MS may wait for the timer to expire before performing undirected or directed searching and/or reselection to an E-UTRAN cell.

In additional embodiments, the permission to perform undirected or directed searching may be updated or changed over time. An updated permission may change whether and/or how the MS conducts an undirected or directed search. The permission to perform undirected or directed searching may be changed in any form of message from the network to the MS, such as but not limited to a broadcast, multicast, or point to point signaling message, may be updated via an OMA (Open Mobile Alliance) DM (Device Management) object broadcast over the air or other over the air or manual provisioning updates by the operator. Thus, as network configurations change, an operator may enable or disable undirected or directed searching in the MS, or otherwise modify or update how the MS conducts undirected or directed searching. The permission to perform undirected or directed searching may be dedicatedly signaled from a corresponding E-UTRAN or GERAN. The permission to perform undirected or directed searching may be updated periodically.

The embodiments also contemplate receiving a permission to perform an undirected search (or selection, as described below) in the form of a first identifying characteristic of a cell of a third RAT. The third RAT may be a GERAN. The first identifying characteristic is associated with a second identifying characteristic used by cells of a first RAT (which may be an E-UTRAN). This embodiment describes the case where the MS is on UTRAN coverage, and the UTRAN access node sends an E-UTRAN indicative ARFCN in its GERAN NCL. The case of a MS on a GERAN cell with the E-UTRAN indicative ARFCN in its GERAN NCL may be described by providing that the third RAT (such as a UTRAN) is the same as a second RAT (such as a GERAN).

Permission to Perform Reselection:

The embodiments described above provide illustrative rules and policies for a MS to perform undirected or directed searching. However, in addition, rules or policies may be provided on which the MS bases a determination whether to report measurements of E-UTRAN cells(s) and/or to perform reselection to an E-UTRAN cell discovered while the MS is constrained. Permission(s) to reselect an E-UTRAN cell may be either the same as, or independent of, the permission(s) to the MS to conduct an undirected or directed search, or may be combinations thereof. The signaling for the two types of permission may use the same or different signaling rules, or combinations thereof. Either type of permission may be changed or may vary over time, or may be static.

For embodiments which refer to indications or rules transmitted by a network, such rules may indicate that one or more additional criteria are useful or required. For example, with respect to combinations of the above exemplary rules for undirected or directed searching, the previous serving cell might indicate that reselection is permitted towards that cell if and only if it is the best (e.g. has the strongest received signal strength) of any with the same center frequency. For embodiments which allow a MS to perform autonomous reselection to an E-UTRAN cell, the MS may perform an undirected attempt to identify E-UTRAN cells operating on one or more frequencies, based on frequencies previously measured or stored while in E-UTRAN coverage, or by searching on the frequency of the most recently observed or used E-UTRAN cell.

In an embodiment, the MS may perform reselection based on one or more of the exemplary rules described above with respect to determining whether to perform an undirected or directed search. Combinations of these rules may, or may not, be the same as those used to determine whether to perform undirected or directed searching. Additionally, the respective indicated permissions may or may not be the same. Nevertheless, similar rules may be used alone or in combination to perform cell reselection.

In another embodiment, permission to perform cell reselection may be provided by the detected E-UTRAN cell or by the original E-UTRAN cell. For example, a flag, bit token or other indicator may be set in broadcast information provided in an E-UTRAN cell. This flag, bit token or other indicator indicates to the MS that it has permission to reselect the corresponding E-UTRAN cell. In another embodiment, the flag/bit token/indicator may be signaled point to point (over the air) to the MS.

In 3GPP TS 36.331, mobility from E-UTRAN is described in section 5.4.3. The mobility procedure covers both handover and cell change order (CCO). For a handover, the MobilityFromEUTRACommand message includes radio resources that have been allocated for the MS in the target cell. The CCO is used for GERAN only. The MobilityFromEUTRACommand message may include system information for the target cell. To indicate support for autonomous cell reselection back to E-UTRAN for the MS, a new parameter may be introduced in the MobilityFromEUTRACommand message. This parameter may allow the MS to perform cell reselection to E-UTRAN after ending a CSFB session in GERAN. Thus, the MobilityFromEUTRACommand may be used to command handover or a cell change from E-UTRAN to another RAT (3GPP or non-3GPP). In this command a field may be added, for example, as part of the message sequence in the form of "Auto-ReselectAllowed", ENUMERATED (true, fromTgtCellOnly,false) OPTION—need OP. The "Auto-ReselectAllowed" indicates whether or not the MS is permitted to autonomously reselect back to E-UTRAN when the voice/CS session in the target RAT is completed. An E-UTRAN neighbour cell list need not be included in the (then) serving cell's system information or transmitted to the mobile station in that cell. If "Auto-ReselectAllowed" is true, then the MS may perform reselection to E-UTRAN cells. If "Auto-ReselectAllowed" is from TgtCellOnly, the MS may perform reselection only if the MS has not changed serving cell since completing the mobility from the E-UTRAN procedure. If "Auto-ReselectAllowed" is false, then the MS may not perform reselection to the E-UTRAN cells.

In yet another embodiment, permission to perform cell reselection may be provided by existing cell reselection rules using specified parameters. The existing reselection rules for reselection to E-UTRAN cells may require the knowledge of various parameters (see 3GPP TS 45.008 version 8.2.0 sub-clause 6.6.6), some of which may be obtained only from the serving GERAN cell that was upgraded and configured for this purpose. In this embodiment, the MS performs cell reselection using these parameters, if available, or some predefined parameters in the case where the parameters are not transmitted by the serving cell. In the case where the cell change from E-UTRAN is controlled, such as by handover or by cell change order, these parameters may be provided by the E-UTRAN cell in the mobility command. In this case, the mobility command could also include the parameters to permit a priority-based reselection algorithm to be carried out in cases where the MS is served by a GERAN cell that does not transmit the desired parameters. For example, MobilityFromEUTRANCommand may indicate a set of E-UTRAN frequencies and possibly their priorities for the directed searches. The MS searches and camps on an E-UTRAN cell on the frequencies whose quality is better than a predefined value or a value indicated by the E-UTRAN cell when the voice/CS session in the GERAN or UTRAN cell is completed.

In still another embodiment, permission to perform cell reselection may be provided by some other mechanism or process. For example, the MS may only select the most recent E-UTRAN cell on which the MS was camped. The MS may also select a cell which operates on the same frequency as that used by the E-UTRAN cell on which it was most recently camped. Other techniques could be used as well.

Allowing a MS to identify and reselect an E-UTRAN cell based on an indication from the original E-UTRAN cell may be implemented as follows. After leaving dedicated mode or dual transfer mode following a CS fallback procedure, a MS may attempt to identify, and (if identified) reselect an E-UTRAN cell if allowed to do so according to the Auto-ReselectAllowed IE included in the MobilityfromEUTRACommand message (see 3GPP TS 36.331). The MS may not perform such a reselection within a first time, such as a number of seconds, after leaving the dedicated mode, or within a second time, such as a number of seconds, if the call was an emergency call. Thus, in an embodiment, the MS may be configured to delay a first time before reselecting to the cell of a first RAT, wherein the first time may be dependent on a type of service on the second RAT that was terminated.

In another example, a MS may attempt to identify an E-UTRAN cell and (if identified) reselect that cell if no E-UTRAN Measurement Parameters structure is received in any instance of the SI2quater message or the Measurement Information message and one or more of the following apply: 1) The E-UTRAN Configuration Status field transmitted in the System Information Type 2 quater message indicates that the absence of the E-UTRAN Measurement Parameters structure does not necessarily indicate the absence of neighbouring E-UTRAN cells (there is no such indication in the known art—this facet is part of the embodiments); 2) One or more ARFCNs in the GSM Neighbour Cell lists corresponds to one or more E-UTRAN frequencies (EARFCNs); 3) One or more ARFCNs in the GSM Neighbour Cell lists explicitly confers permission to search and (if identified) reselect an E-UTRAN cell; or 4) [Non-CSFB case] the most recent serving cell before the current serving cell was an E-UTRAN cell and the system information [or other point-to-point information] transmitted in that cell indicated that such reselection is permitted.

The MS may receive an E-UTRAN configuration status field. This field indicates the configuration status of the E-UTRAN neighbour cell list. For example, if set to "1," this field indicates that the absence of the E-UTRAN Measurement Parameters structure indicates the absence of neighbouring E-UTRAN cells. If set to "0," the absence of the E-UTRAN Measurement Parameters structure does not necessarily indicate the absence of neighbouring E-UTRAN cells.

The ARFCN to EARFCN mapping may be implemented in the following manner. An E-UTRAN ARFCN Mapping Description structure indicates that the presence of specific ARFCNs in a GSM neighbour cell list (which are not used for GSM cells) indicates the presence of neighbour cells on one or more of the E-UTRAN frequencies, identified by either an EARFCN or E-UTRAN Frequency Index.

In a particular non-limiting embodiment, the following code may be exemplary:

```
< E-UTRAN ARFCN Mapping Description structure > ::=
    {1
        ARFCN : bit (10) >
        { 1 < EARFCN : bit (16) > } ** 0
        { 1 < E-UTRAN_FREQUENCY_INDEX : bit(3) > } ** 0
    } ** 0;
```

Alternatively, E-UTRAN frequencies may be indicated by the presence OT one or more GSM ARFCNs, each of which corresponds to one or more E-UTRAN frequencies. In this case, the MS shall not include E-UTRAN parameters within measurement reports, but may report the strongest E-UTRAN neighbour cell by means of its corresponding GSM ARFCN. The received signal strength indication (RSSI) value to use in such a case may be implementation-specific.

If the list of GSM frequencies in a neighbour cell list includes one or more frequencies which are known to correspond to one or more E-UTRAN frequencies (EARFCNs), then the mobile station may build the E-UTRAN neighbour cell list as if those ARFCNs corresponded to E-UTRAN frequencies. The E-UTRAN neighbour cell list may apply only to a multi-RAT MS supporting E-UTRAN. One or more instances of the SI2quater message may provide E-UTRAN frequencies, and zero or more not allowed physical layer cell identities for each E-UTRAN frequency. Alternatively, E-UTRAN frequencies may be indicated by the presence of one or more GSM ARFCNs, each of which corresponds to one or more E-UTRAN frequencies. The E-UTRAN frequencies define the E-UTRAN neighbour cell list. The E-UTRAN neighbour cell list may contain up to 8 frequencies, possibly more. The MS behavior is not specified if the number of E-UTRAN frequencies exceeds the MS monitoring capabilities, as defined in 3GPP TS 45.008.

Figure 2:
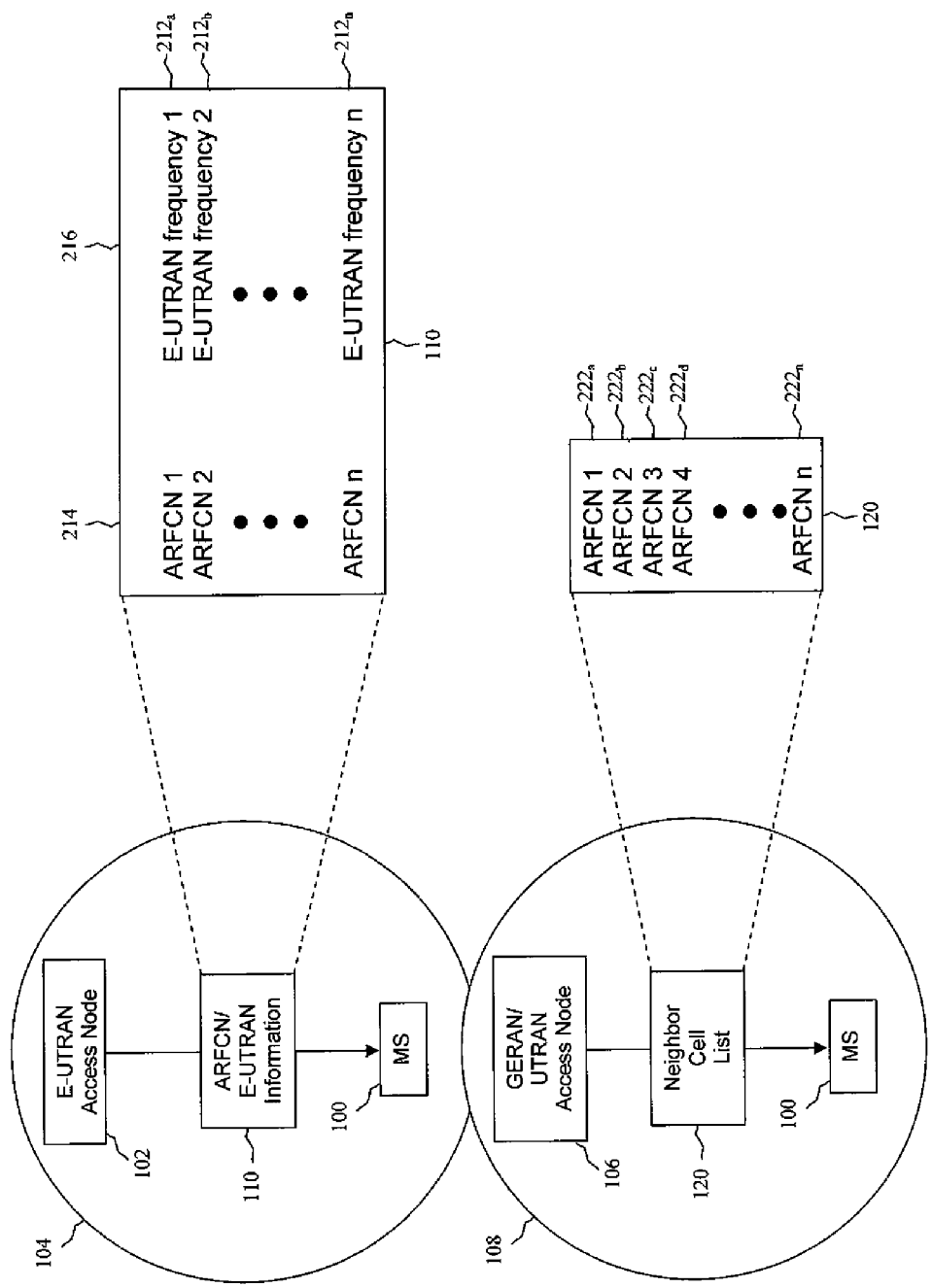
FIG. 2 is a diagram illustrating a wireless communication system, according to an embodiment of the disclosure.

FIG. 2 is a diagram illustrating a wireless communication system, according to an embodiment of the disclosure. Reference numerals common to FIG. 2 and FIG. 1 refer to substantially similar objects. For example, FIG. 2 is similar to FIG. 1 in that the MS 100 is shown as possibly being in communication with both an E-UTRAN cell 104 and a GERAN/UTRAN cell 108.

As mentioned above, an MS may base its decision to perform undirected or directed searches and/or reselection on the reception of an E-UTRAN-indicative ARFCN. Details of this procedure will now be provided. In this embodiment, while an MS is in an E-UTRAN cell, the MS is provided with one or more identifiers that are valid but unused in a non-E-UTRAN network (for example, in a GERAN or UTRAN network). The identifiers are or can be associated with the carrier frequencies for the current E-UTRAN cell and possibly one or more other E-UTRAN cells. If the MS later enters a GERAN/UTRAN cell, the MS might be provided with a neighbour cell list for cells near the GERAN/UTRAN cell. If the neighbour cell list includes one or more of these E-UTRAN indicative identifiers (i.e. valid identifiers for the current network but that are associated with E-UTRAN cells), the MS knows to attempt to identify, and possibly reselect, those E-UTRAN cells.

More specifically, the identifiers might be unused broadcast control channel (BCCH) absolute radio frequency channel numbers (ARFCNs) for one or more GERAN/UTRAN cells. One of skill in the art will recognize that a plurality of ARFCNs might be available to identify the GERAN/UTRAN cells in a given geographic region, but that all of the available ARFCNs are not necessarily used. In some cases, the ARFCNs might be numbered from 0 through 1023, where ARFCNs 0 through 800 are valid and ARFCNs 801 through 1023 are not valid. As used herein, the term "valid but unused ARFCN" might refer to an ARFCN numbered 801 through 1023, to an ARFCN numbered 0 through 800 that is not currently in use in a given geographic region, or to any other ARFCN that is not currently in use in a given geographic region.

In an embodiment, at least one valid but unused ARFCN is mapped to the carrier frequency for at least one E-UTRAN cell. Such an ARFCN can be referred to as an E-UTRAN-indicative ARFCN. An MS that is aware of the mapping can attempt to identify the E-UTRAN cell with the mapped carrier frequency when the mapped ARFCN appears in a neighbour cell list provided to the MS.

An example of this embodiment is illustrated in FIG. 2, where the MS 100, E-UTRAN access node 102, E-UTRAN cell 104, GERAN/UTRAN access node 106, and GERAN/UTRAN cell 108 as shown in FIG. 1 are again depicted. When the MS 100 is present in the E-UTRAN cell 104, the E-UTRAN access node 102 provides the MS 100 with information 110 related to one or more valid but unused ARFCNs. In some cases, the information 110 associates at least one valid but unused ARFCN with at least one E-UTRAN frequency. In other cases, the information 110 is a valid but unused ARFCN that the MS 100 can associate with an E-UTRAN frequency. In yet other cases, the information 110 is a valid but unused ARFCN that indicates general permission for undirected searching and possibly reselection.

In the illustrated embodiment, the information 110 is a map in which one or more ARFCNs are associated with the carrier frequencies for one or more E-UTRAN cells. Each entry 212 of the map ties an unused ARFCN 214 to the carrier frequency 216 of an E-UTRAN cell. More than one E-UTRAN cell may use each of the E-UTRAN frequencies 216, and more than one E-UTRAN frequency 216 could be mapped to one ARFCN 214. In another embodiment, as described in detail below, rather than providing a map to the MS 100, the E-UTRAN access node 102 provides the MS 100 with information with which the MS can create a map. In another embodiment, as described in detail below, the ARFCNs 214 indicate permission to perform undirected or directed searches and possibly reselection. In any of these cases, the information that the E-UTRAN access node 102 provides to the MS 100 will be referred to herein as the ARFCN/E-UTRAN information 110. The ARFCN/E-UTRAN information 110 can be provided to the MS 100 using one of several different techniques, as described below. Also, in some cases, the MS 100 might store the association between at least one unused ARFCN and at least one E-UTRAN frequency for later use.

In an embodiment, if the MS 100 later connects to the GERAN/UTRAN access node 106, the GERAN/UTRAN access node 106 can send the MS 100 a neighbour cell list 120 that might include one or more of the ARFCNs 214 that were included in the ARFCN/E-UTRAN information 110. Standard operations and maintenance procedures might be used to configure the GERAN/UTRAN access node 106 to be able to broadcast the neighbour cell list 120 to the MS 100. In this manner, the GERAN/UTRAN access node 106 would not need to be upgraded in order to be able to provide the MS 100 with one or more of the ARFCNs 214 that were included in the ARFCN/E-UTRAN information 110.

If the MS 100 attempts to leave the GERAN/UTRAN cell 108, the MS 100 can compare the ARFCN entries 222 in the neighbour cell list 120 to the ARFCN entries 214 in the ARFCN/E-UTRAN information 110. If one or more of the ARFCN entries 222 in the neighbour cell list 120 match one or more of the ARFCN entries 214 in the ARFCN/E-UTRAN information 110, the MS 100 knows that the frequencies 216 associated with those ARFCN entries 214 are the center frequencies for E-UTRAN cells. The MS 100 can then use those E-UTRAN frequencies 216 to attempt to identify an E-UTRAN cell. If an E-UTRAN cell is identified, the techniques described above might be used to determine whether the MS 100 connects to the E-UTRAN cell. In this manner, the MS 100 might be able to connect to the E-UTRAN cell 104 or another E-UTRAN cell after becoming constrained in the GERAN/UTRAN cell 108. This technique might be used instead of or in addition to the techniques described above for a MS to attempt to identify and reselect an E-UTRAN cell after becoming constrained in a GERAN/UTRAN cell.

As mentioned above, the E-UTRAN access node 102 might provide the ARFCN/E-UTRAN information 110 to the MS 100 using various techniques. In an embodiment, non-access stratum (NAS) signaling is used to provide the ARFCN/E-UTRAN information 110 to the MS 100. That is, associations are made in the E-UTRAN core network (also known as the evolved packet core or EPC) between one or more ARFCNs 214 and one or more E-UTRAN frequencies 216. The resulting map could then be given to the MS 100 when the MS 100 attaches to the EPC. Such NAS signaling may occur when the MS 100 moves from one cell to another and/or at periodic intervals. In this manner, the ARFCN/E-UTRAN information 110 could be provided to the MS 100 by making only minimal upgrades to the core network elements. Modifications would not be needed for the access nodes.

In other embodiments, access stratum (AS) signaling is used to provide the ARFCN/E-UTRAN information 110 to the MS 100. In these cases, an access node transmits the ARFCN/E-UTRAN information 110 over the air to the MS 100. In one embodiment, the E-UTRAN access node 102 broadcasts an ARFCN 214 in its system information. When the MS 100 receives the broadcast, the MS 100 associates the ARFCN 214 with the E-UTRA ARFCN (EARFCN) of the current cell 104. The MS 100 might store the association between the ARFCN and the E-UTRAN frequency so that the E-UTRAN frequency can be used later if the MS 100 becomes constrained in a GERAN/UTRAN cell.

Alternatively, the E-UTRAN access node 102 broadcasts, multicasts, or point-to-point transmits a list of ARFCNs 214 and a list of associated E-UTRAN frequencies 216. Other cell reselection parameters could also be transmitted, such as a minimum quality threshold for reselection to an E-UTRAN cell. The MS 100 could receive this information and store it for later use. In other embodiments, a GERAN/UTRAN access node with advanced capabilities could transmit such information.

In another embodiment, a single E-UTRAN-indicative ARFCN 214 might indicate permission for undirected searching or for both undirected searching and reselection. Alternatively, one E-UTRAN-indicative ARFCN 214 might indicate permission for undirected searching and another E-UTRAN-indicative ARFCN 214 might indicate permission for reselection.

In an embodiment, the ARFCN/E-UTRAN information 110 might be valid only within a limited scope. For example, the ARFCN/E-UTRAN information 110 might be valid only for a limited time or only within a limited geographic region. Alternatively or in addition, the ARFCN/E-UTRAN information 110 might be valid only within certain cells. For instance, in the case where the mapping was provided by NAS, the ARFCN/E-UTRAN information 110 might be applicable only in the cell in which the ARFCN/E-UTRAN information 110 was provided to the MS 100. Alternatively, the ARFCN/E-UTRAN information 110 might be applicable only in cells operated by the same operator that operates the cell in which the ARFCN/E-UTRAN information 110 was provided to the MS 100 or only in cells within the same location area or tracking area, or within the same PLMN or equivalent PLMN as that in which the information 110 was received.

In various embodiments, an ARFCN 214 that is mapped to an E-UTRAN frequency 216 could be used according to various different techniques. For example, when the MS 100 is in a GERAN/UTRAN cell and measures the quality parameters of one or more neighbouring E-UTRAN cells, the MS 100 could use the ARFCNs 214 associated with the E-UTRAN cells to inform the GERAN/UTRAN access node of the center frequency or frequencies of the E-UTRAN cells on which the measurements were performed. Also, when the MS 100 intends to move to one of the neighbouring E-UTRAN cells, the MS 100 could use the ARFCN 214 associated with that E-UTRAN cell to inform the GERAN/UTRAN access node of the center frequency or frequencies of the E-UTRAN cell to which the MS 100 intends to move.

In addition, when the GERAN/UTRAN access node is informed that the MS 100 intends to move to an E-UTRAN cell associated with one of the unused but valid ARFCNs 214, the GERAN/UTRAN access node can use the received ARFCN 214 to confirm to the MS 100 that the MS 100 can continue reselection. Also, the GERAN/UTRAN access node can order the MS 100 to reselect an E-UTRAN cell and can use an ARFCN 214 to identify the carrier frequency of the E-UTRAN cell to which the MS 100 should move.

In yet another embodiment, the E-UTRAN indicative ARFCN information 110 might be received by an MS that is capable of recognizing that this is an E-UTRAN indicative ARFCN, but the MS is not capable of connecting to E-UTRAN cells. Such an MS might be provided with logic such that upon receiving an E-UTRAN-indicative ARFCN 214, the MS refrains from searching for a GERAN/UTRAN cell that is associated with the E-UTRAN-indicative ARFCN 214. Since the ARFCN is valid but unused in the GERAN/UTRAN system, no such GERAN/UTRAN cell exists, and therefore the MS would not be able to connect to a cell that is associated with this ARFCN. Prohibiting this search could save battery and processing power that the MS might otherwise waste by attempting to connect to such a cell. The E-UTRAN indicative ARFCN/E-UTRAN information mapping 110 could be provisioned to such an MS through NAS signaling or in some other manner.

Figure 3:
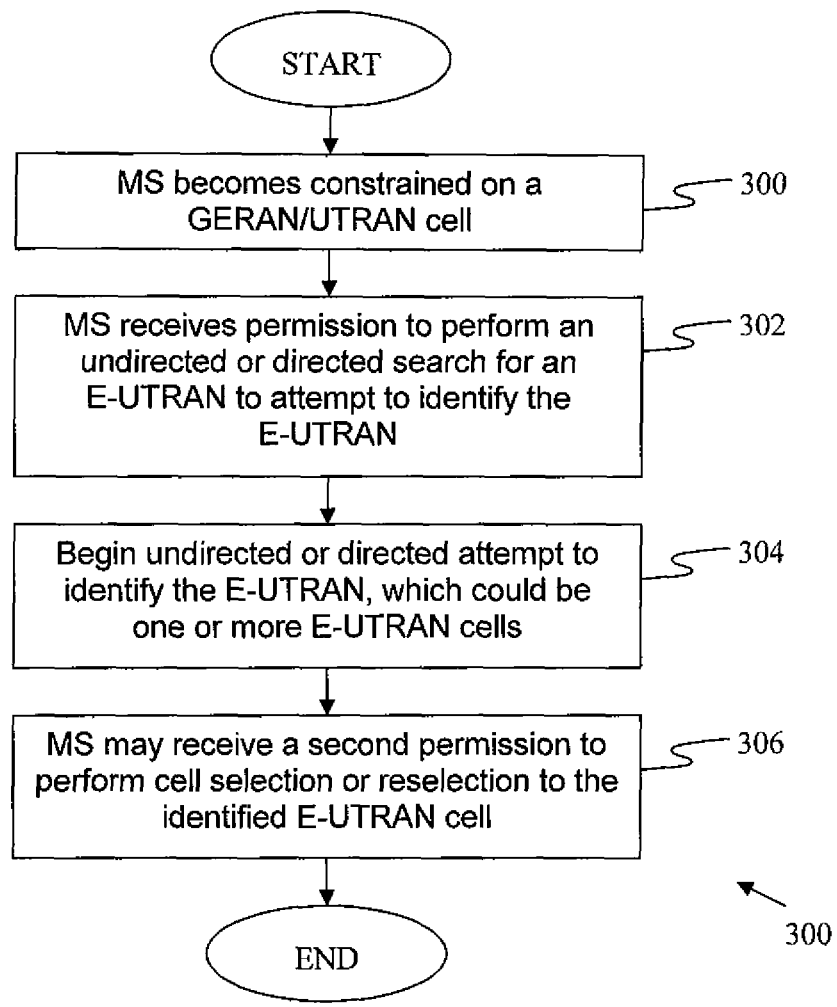
FIG. 3 is a flowchart illustrating a process of a MS performing undirected searching and subsequent reselection, according to an embodiment of the disclosure.

FIG. 3 is a flowchart illustrating a process of a MS performing undirected searching and subsequent reselection, according to an embodiment of the disclosure. The process shown in FIG. 3 may be implemented in a MS, such as MSs 100, 110A, or 110B in FIG. 1. The process system 300 shown in FIG. 3 may be implemented according to the devices and methods described with respect to FIG. 1 and/or FIG. 2. In an embodiment, the method shown in FIG. 3 is implemented in a MS enabled to communicate with both an evolved universal terrestrial radio access network (E-UTRAN) and a general packet radio service/enhanced data rates for global evolution radio access network (GERAN).

The process begins as a MS becomes constrained on a GERAN/UTRAN cell (block 300). The MS receives permission to perform an undirected or directed attempt to identify an E-UTRAN to attempt to identify the E-UTRAN (block 302). In an embodiment, the permission is received before the MS becomes constrained on the GERAN/UTRAN cell. In another embodiment, receiving permission includes the permission being provisioned into the device by the network operator prior to the device being used in a live network. In another embodiment, receiving permission includes the permission being stored in a memory of the device at the time of device manufacture or at any other time and retrieved from memory to be used by the MS at any time. The term "receiving permission" includes the MS receiving permission in this manner before becoming constrained. Subsequently, the MS may (depending on the permission) begin the undirected or directed attempt to identify the E-UTRAN, which could be one or more E-UTRAN cells (block 304).

Optionally, before conducting the undirected search, the MS performs a circuit switched (CS) fallback service, which is the cause for the MS becoming constrained. In this case, the undirected search is responsive to terminating the CS fallback service.

Optionally, the permission is received from a previous serving E-UTRAN cell. Optionally, the permission is received from a GERAN or UTRAN cell.

In another embodiment, the permission is received in the form of an indicative E-UTRAN ARFCN. In this case, the indicative E-UTRAN ARFCN is identified via a mapping as an E-UTRAN absolute radio frequency channel number (EARFCN). In another embodiment, the permission is received in the form of an indicative E-UTRAN ARFCN, but this ARFCN does not map to an E-UTRAN frequency, but rather is a general indicator.

Permission to perform reselection may be based on dedicated priorities previously received by the MS. The permission may be stored on at least one of a subscriber identity module (SIM) and a memory of the MS prior to the MS becoming constrained.

In another embodiment, the permission may be based on at least one of a mobility change and a cell change. In this case, the permission may be based on a number of cell changes since the MS was last served by an E-UTRAN cell. Alternatively, the permission is based on the MS being in the same location area or routing area as when the MS initially left E-UTRAN service. Alternatively the permission may be based on other mobility factors, such as but not limited to absolute location determined by location information in the MS (e.g. as could be obtained using GPS) or a velocity of mobility information for example.

In yet another embodiment, the permission is communicated by non-access stratum (NAS) signaling. The permission may be received from user input. The permission may be received responsive to the MS successfully performing a recent combined attach procedure in an evolved packet system (EPS). The permission may be received responsive to the MS being capable of internet protocol multimedia subsystem (IMS) voice service.

Returning to FIG. 3, optionally, the MS may receive a second permission to perform cell reselection or reselection to the identified E-UTRAN cell (block 306). The process terminates thereafter. The term "receiving second permission" includes the MS receiving permission in this manner before becoming constrained. In fact the second permission may be received in any of the ways in which the first permission may be received. The second permission may be received from the target E-UTRAN cell. The second permission may be a flag, bit token or other indicator set in broadcast information. Alternatively, the flag/bit token/indicator may be signaled point to point to the MS. The second permission may be the same as the first permission. The second permission may be a reselection rule stored in the MS. The second permission may be such that the MS may only select the most recent E-UTRAN cell on which the MS was camped. In an embodiment, the MS may store the second permission in memory. In an embodiment, the permission may be received after reselection, that is that the MS needs to attempt reselection to an E-UTRAN cell and then will learn from the reselected cell whether or not it has permission to camp on it. In an embodiment, the MS may receive a third permission (which may be independent or part of the second permission or part of the first permission) to measure the E-UTRAN cell or cells. The third permission allows the MS to measure and then report these measurements back to the E-UTRAN and/or the GERAN/UTRAN.

Figure 4:
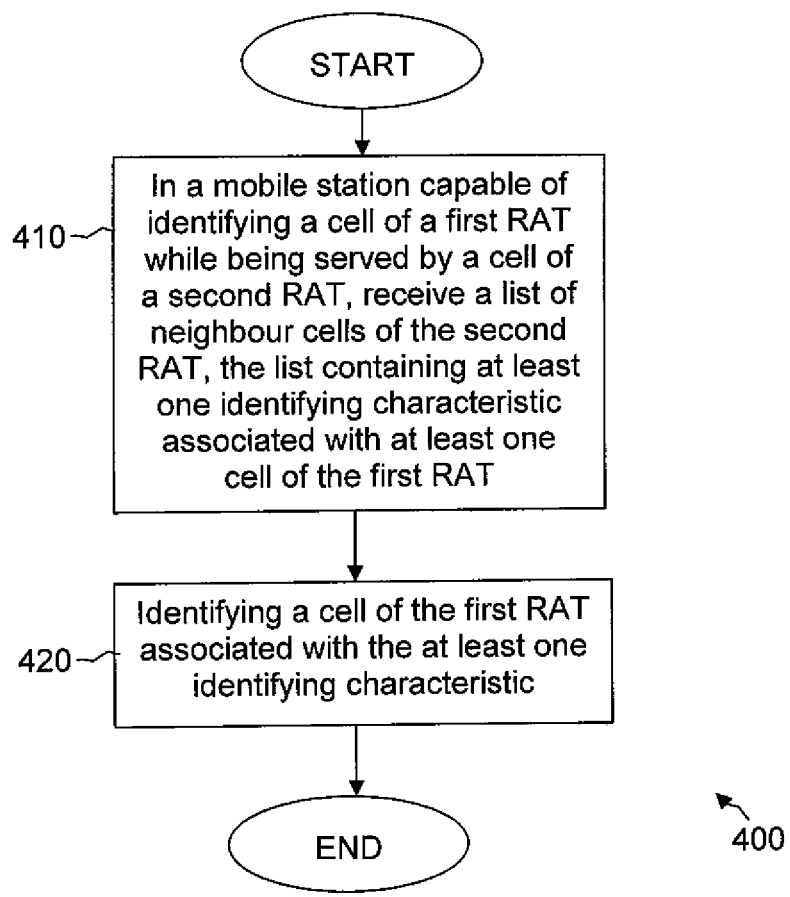
FIG. 4 is a flowchart illustrating a method for granting a MS permission to search one or more E-UTRAN frequencies while in a GERAN cell, according to an embodiment of the disclosure.

FIG. 4 is a flowchart illustrating a method for granting a MS permission to search one or more E-UTRAN frequencies while in a GERAN cell, according to an embodiment of the disclosure. The process 400 shown in FIG. 4 may be implemented in a MS, such as MSs 100, 110A, or 110B in FIG. 1. The process shown in FIG. 4 may be implemented according to the devices and methods described with respect to FIG. 2. In an embodiment, the method shown in FIG. 4 is implemented in a MS enabled to communicate with both an evolved universal terrestrial radio access network (E-UTRAN) and a GSM/EDGE radio access network (GERAN).

In an embodiment, the process takes place in a mobile station capable of identifying a cell of a first RAT while being served by a cell of a second RAT. The process begins as the mobile station receives a list of neighbour cells of the second RAT, the list containing at least one identifying characteristic associated with at least one cell of the first RAT (block 410). The mobile station then identifies a cell of the first RAT associated with the at least one identifying characteristic (block 420). The process terminates thereafter.

The embodiments described herein are proposed for GERAN, UTRAN, and E-UTRAN networks. However, the embodiments are equally applicable for any combination of radio access technologies where asymmetry in mobility procedures, neighbour cell lists, or other features gives rise to a MS becoming constrained. Thus, the embodiments apply to any situation in which a MS is constrained in a first network type and desires to connect to a second network type.

Figure 5:
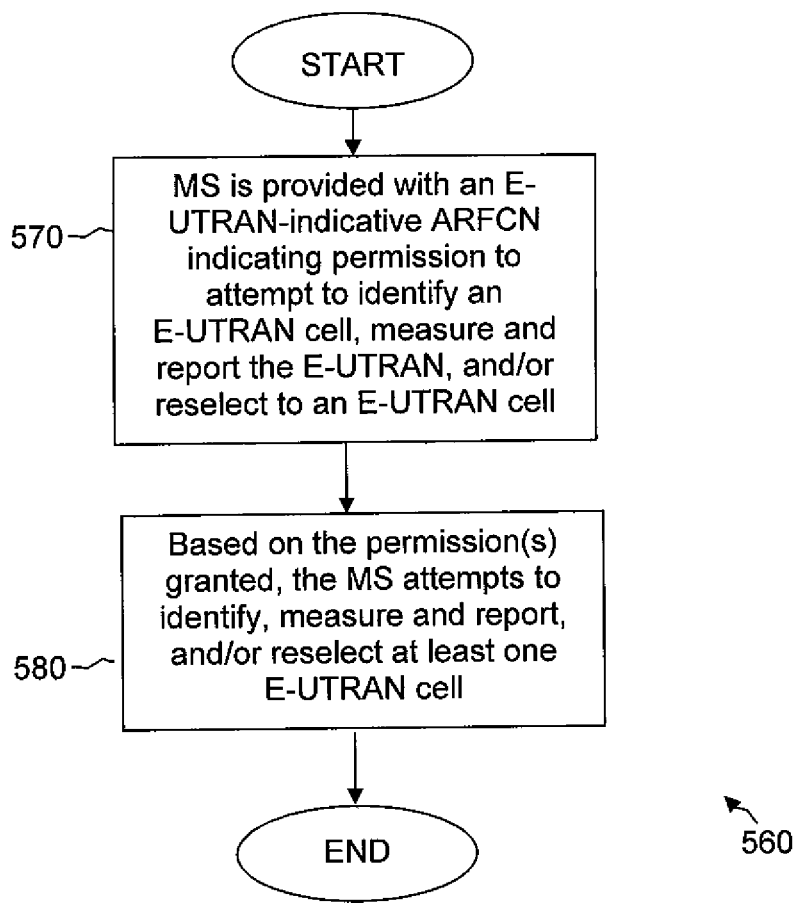
FIG. 5 is a flowchart illustrating a method for granting an MS permission to search one or more E-UTRAN frequencies while in a GERAN cell, according to an embodiment of the disclosure.

FIG. 5 is a flowchart illustrating a method for granting an MS permission to search one or more E-UTRAN frequencies while in a GERAN cell, according to an embodiment. The process shown in FIG. 5 may be implemented in an MS, such as MSs 100, 110A, or 1108 in FIG. 1. The process 500 shown in FIG. 5 may be implemented according to the devices and methods described with respect to FIG. 2. In an embodiment, the method shown in FIG. 5 is implemented in an MS enabled to communicate in both E-UTRAN and GERAN/UTRAN.

The process begins at block 570, where an MS is provided with an E-UTRAN-indicative ARFCN indicating that the MS has permission to attempt to identify an E-UTRAN cell, measure and report the E-UTRAN, and/or reselect to an E-UTRAN cell. At block 580, based on the permission(s) granted, the MS attempts to identify, measure and report, and/or reselect at least one E-UTRAN cell.

Figure 6:
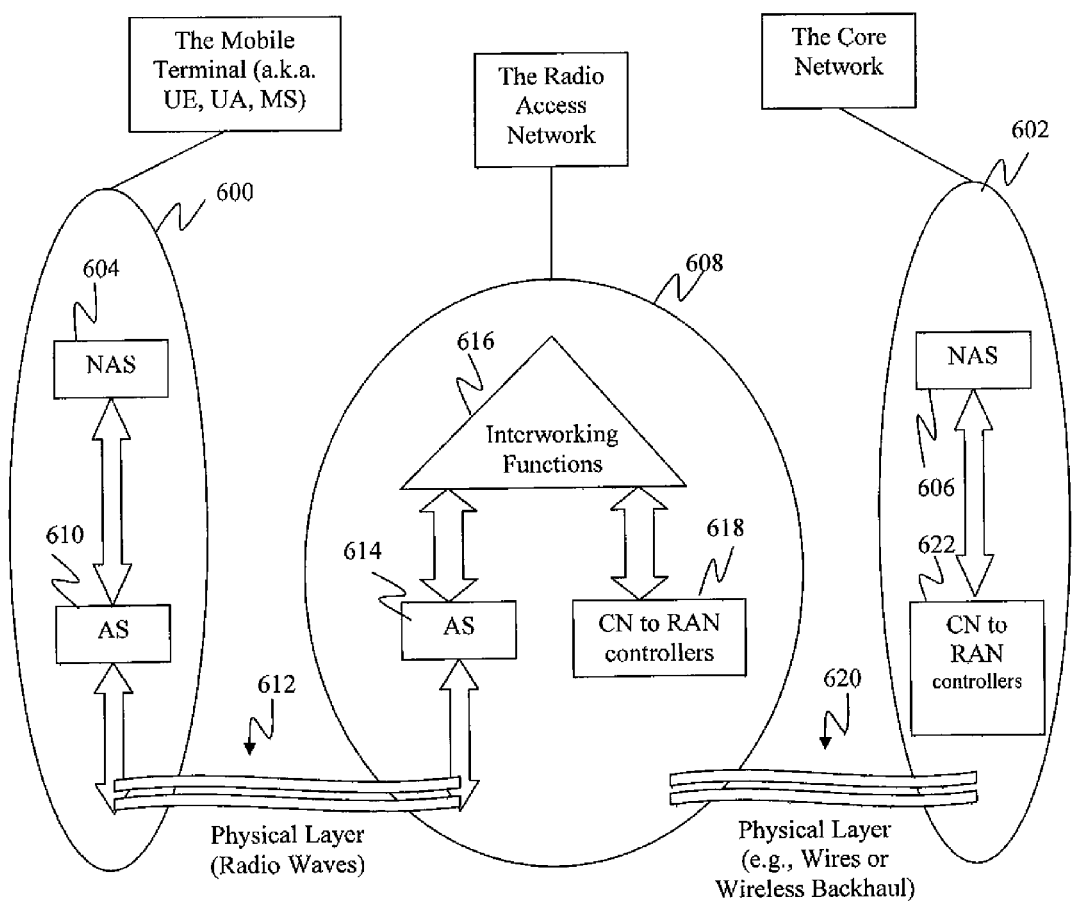
FIG. 6 is a block diagram illustrating a MS communicating with a core network via a radio access network, according to an embodiment of the disclosure.

FIG. 6 is a block diagram illustrating a MS communicating with a core network via a radio access network, according to an embodiment of the disclosure. In an illustrative embodiment, a MS 600, which could be or MS 100 or MS 110A/B of FIG. 1, attempts to establish a connection with a CN 602. Such an attempt can be referred to as a mobile originating call, or MO, because the MS initiates the connection attempt. However, the following processes can also apply to a mobile terminating (MT) call, wherein the CN 602 initiates the connection attempt.

To initiate the connection attempt, the MS NAS 604 sends a request message, e.g., a SERVICE REQUEST or EXTENDED SERVICE REQUEST, to the CN NAS 606 via a radio access network (RAN) 608. The MS NAS 604 initiates the request and, within the MS 600, transmits the request to the MS access stratum (AS) 610. In turn, the AS 610 transmits the request over a physical layer, such as radio waves as shown by arrow 612, to the RAN 608.

The RAN AS 614 receives the request, and allocates preliminary resources to the MS 600 and then communicates the request to interworking functions 616 of the RAN 608. Interworking functions may include managing the request relative to other requests, as well as other functions. Interworking functions 616 also communicate with CN to RAN controllers 618, which control communications between the RAN 608 and the CN 602. The actual communication of the request between the RAN 608 and the CN 602 is transmitted along a physical layer, which may be wires or cables, for example, as shown by arrow 620. The physical layer 620 can also be implemented as a wireless backhaul.

Within the CN 602, CN to RAN controllers 622 receive the request and transmit the request to the CN NAS 606. The CN NAS 606 then decodes the data within the request, and takes an appropriate action to allocate additional or necessary mobile resources to the MS 600 for that wireless communication. The CN NAS 606 transmits such information to the MS 600 via the RAN 608 in a manner similar to the process described above, but in the other direction.

In another embodiment, the CN initiates a MT (mobile terminating) call. The process described above occurs from CN NAS 606 to MS NAS 604 in a process similar to that described above.

Within the context of FIG. 1 and FIG. 6, a CSFB (circuit switched fallback) procedure may be understood. CS fallback in EPS enables voice and other CS domain services by reusing networks that have the CS infrastructure when the MS is initially served by an E-UTRAN network. Examples of networks that have the CS infrastructure include GERAN and UTRAN networks. Thus, a CSFB enabled MS connected to an E-UTRAN network may use GERAN or UTRAN networks to establish one or more CS domain services. CS fallback is used where coverage of E-UTRAN and GERAN/UTRAN RANs overlap.

A CSFB capable MS also supports combined procedures for EPS/IMSI attach, update, and detach functions. These procedures allow the terminal to be registered both with an MME, for packet switched domain services provided using the E-UTRAN network, and with an MSC and MME to create an association between them based on the fact that the MS is simultaneously registered with each of them.

CSFB calls generally fall into two types: a mobile originating (MO) call and a mobile terminating (MT) call. The first type of CSFB call is a mobile originating call, in which the MS initiates a CSFB call. For the MO call, when the MS is in E-UTRAN and desires to make a CSFB call or use CS services, the MS sends an Extended Service Request with the CSFB indicator to the MME. The MS may only transmit this request if the MS is attached to a CS domain and has previously registered with an MSC.

The MME sends a message to the eNB that indicates that the MS should be moved to UTRAN/GERAN. At this point, the eNB may optionally solicit a measurement report from the MS to determine the target cell in the GERAN or UTRAN. If packet switched handover in GERAN is supported, then eNB triggers a packet switched handover to a GERAN/UTRAN neighbour cell by sending a Handover Required message to the MME. Then, an inter-RAT handover from E-UTRAN to UTRAN or GERAN begins, as specified in 3GPP TS 23.401. As part of this handover, the MS receives a HO from E-UTRAN command and tries to connect to a cell in the target RAT. This command may contain a CSFB Indicator which tells the UE that the handover is triggered due to a CSFB request.

Alternatively (e.g. if PS handover is not supported in GERAN), then the eNB triggers an inter-RAT cell change order, optionally with NACC, to the GERAN cell by sending an RRC message to the MS. The inter-RAT cell change order may contain a CSFB Indicator which indicates to the MS that the cell change order is triggered due to a CSFB request. If the inter-RAT cell change order contains a CSFB Indicator, and the MS fails to establish connection to the target RAT, then the MS considers that the CSFB procedure has failed. A Service Request procedure is considered to be successfully completed when the cell change order procedure is completed successfully.

In GERAN A/Gb mode, the MS established a radio relay connection by using the procedures specified in 3GPP TS 44.018. The MS requests and is assigned a dedicated channel. Once the CS resources have been allocated in the GERAN cell, and the main signaling link is established as described in 3GPP TS 44.018, the MS enters a Dual Transfer Mode (if supported by both the MS and the new cell) or Dedicated Mode. The CS call establishment procedure then completes.

If the MSC serving the GERAN/UTRAN cell is different from the MSC that served the MS when it was camped on E-UTRAN, then the MSC will reject the service required unless an implicit location update is performed. When the target system operates in Network Mode of Operation (NMO) 1, then if the MS is still in UTRAN/GERAN after the CS voice call is terminated, and if a combined RA/LA update has not already been performed, then the MS performs a combined RA/LA update procedure. This procedure is used to create an association between the MSC and the SGSN and to release the association between the MSC and the MME.

Once the CS services end in the CS domain, the MS may move back to E-UTRAN by means of mobility mechanisms described above with respect to FIG. 1 through FIG. 4. The MS may then send a NAS message, such as a Service Request or TAU, to the MME. If the MS context in the MME indicates that the MS is in suspended status, the MME sends a Resume Request (IMS) message to the S-GW that request the resumption of EPS bearers for the MS. The S-GW acknowledges the Resume Request and clears the MS's suspending status, and the NAS message is processed accordingly.

The second type of CSFB call mentioned above is a mobile terminating (MT) call, in which a CSFB call is placed to the MS. For a MT CSFB call, the paging message is sent to the MME from the MSC, including location information necessary or desirable to page the terminal. This information is sent to one or more eNBs. Upon receiving the page, the MS establishes an RRC connection and sends an Extended Service Request (with CSFB indicator) to the MME. The MME then sends parameters to the eNB in order to move the MS to UTRAN/GERAN. The eNB may optionally solicit measurement reports from the MS to determine the target cell to which the MS should be redirected.

After that, the eNB releases the RRC connection with redirection information to change to a CS capable RAT. As an option, system information corresponding to the target cell might be provided by the eNB. In this case, the MS receives an inter-RAT cell change order that may contain a CSFB indicator. If the LA/RA information of the new cell is different from the one stored in the MS, and if the target system operates in NMO1, then the MS performs a combined RA/LA procedure. If the target system does not operate in NMO1, then the MS performs a LAU.

The MS responds with a page response message to the MSC in the new RAT and then enters either DTM or Dedicated Mode (if in GERAN) or RRC_CONNECTED mode (if in UTRAN), and the CS call establishment procedure completes. If the MS is still in UTRAN/GERAN after the CS voice call is terminated, and if a LAU or a combined RA/LA update has not already been performed in the call establishment phase, then the MS performs either a LAU or the combined procedure. The mobility from E-UTRAN to the CS-capable RAT, particularly in the case of UMTS, may also be performed by means of a PS Handover procedure in a manner similar to that described for the MO call.

The details of a CS fallback communication procedure in mobile communication systems prior to LTE/EPS—such as UMTS—may not be necessary to an understanding of the present disclosure. For example, a MS might become constrained in situations other than in CS fallback procedures. The embodiments contemplate procedures for allowing the MS to reconnect to an E-UTRAN or other LTE network regardless of the manner in which the MS became constrained on a GERAN network.

Figure 7:
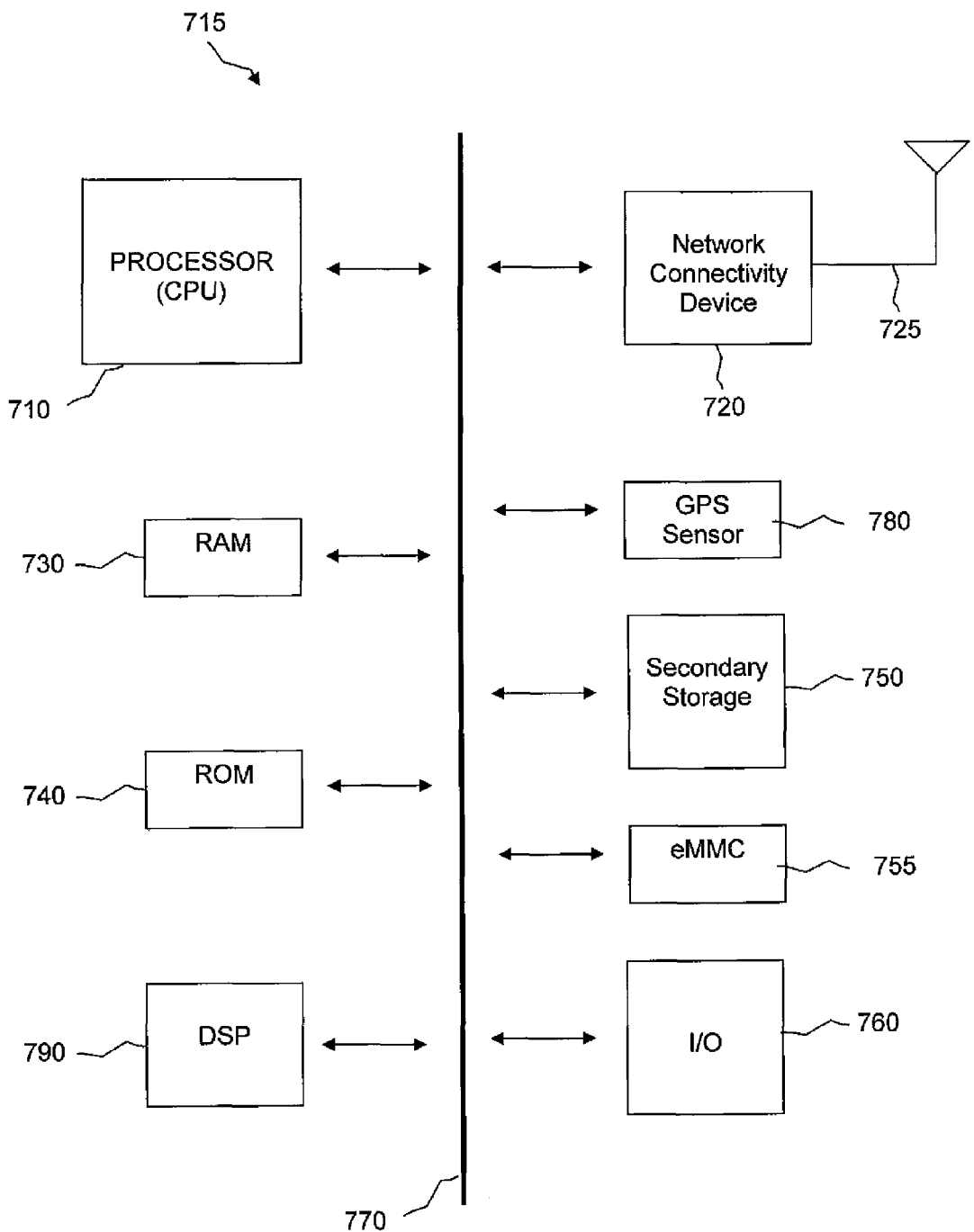
FIG. 7 illustrates a processor and related components suitable for implementing the several embodiments of the present disclosure.

The MS and other components described above might include a processing component that is capable of executing instructions related to the actions described above. FIG. 7 illustrates an example of a system 715 that includes a processing component 710 suitable for implementing one or more embodiments disclosed herein. In addition to the processor 710 (which may be referred to as a central processor unit or CPU), the system 700 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a digital signal processor (DSP) 790. Although the DSP 790 is shown as a separate component, the DSP 790 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 725 might be considered to be a component of the I/O devices 760 instead of or in addition to being a component of the network connectivity devices 720.

The following are incorporated herein by reference for all purposes: 3rd Generation Partnership Project (3GPP) Technical Specifications (TS) 23.272, 23.401, 36.101, 36.331, 44.018, 44.060, 45.005, and 45.008.

A generic access network (GAN) may use an ARFCN to identify a GAN controller in those cases where a MS is connected via an internet protocol (IP) network, rather than by a radio access network (RAN) such as GERAN, UTRAN, etc., which is the type of network used by most wireless communication devices. However, the use of a GSM ARFCN in this case does not address the possibility of a MS becoming constrained for the following reasons: 1) in the GAN case, the use of an ARFCN is primarily to permit measurement reports and voice handovers to be triggered without any upgrade to the GERAN network; 2) the coverage of a GAN network is not known to the operator, since GAN coverage is typically provided by means of wireless communications using unlicensed spectrum (e.g. by means of IEEE 802.11 communications), where the access points are not owned by the operator and hence their location may not be known; and 3) connectivity to an 802.11 access point or other IP network does not necessarily mean that connectivity to the GANC is possible. Therefore, there exists a disconnect between the radio level coverage and the meaning of the ARFCN. In fact, the 'undirected search' for the GANG is based on knowledge in the MS of the GANC's IP address (or internet host name), rather than the ARFCN indicated by a GERAN network. Hence, (critically) the presence of an ARFCN in a GERAN neighbour cell list which corresponds to a GANC is independent of the MS's process of attempting to connect to the GANC. However, use of an ARFCN in an IP network may not be useful for those situations in which a MS becomes constrained, because no other unified addressing structure exists for GAN cells other than the ARFCN. ARFCN is the addressing scheme for GAN—whereas E-UTRAN does have an addressing scheme. The ARFCN for a GAN network identifies a physical box or router, whereas identifiers for E-UTRAN and GERAN networks identify cells. Because GAN networks are different from E-UTRAN, and GERAN networks, the use of an ARFCN in GAN networks is not related to the above-described solutions for a MS that is constrained in a GERAN network and desires to connect to an E-UTRAN network.

Thus, the embodiments provide for a mobile station capable of being served via a first radio access technology (RAT) and a second RAT. The mobile station includes a component configured to receive a permission to identify a cell of the first RAT in absence of a first radio access type neighbour cell list for a serving cell of the second RAT. The mobile station also includes a component configured to identify a cell of the first RAT after receiving the permission. In an embodiment, the first radio access type neighbour cell list for a serving cell of the second RAT can be an E-UTRAN neighbour cell list used in accordance with 3GPP TS 44.018 and TS 45.008.

In another embodiment, a device, method, and a program on a computer readable medium is provided for a mobile station that is capable of being served via a first radio access technology (RAT) and a second RAT. The mobile station includes a component configured to receive a permission to identify a cell of the first RAT in absence of a first radio access type neighbour cell list for a serving cell of the second RAT. The mobile station also includes a component configured to identify a cell of the first RAT after receiving the permission.

In yet another embodiment, a device, method, and a program on a computer readable medium is provided for an access node. The access node includes a component configured to communicate with a mobile station operating on one of a first radio access technology (RAT) and a second RAT. The component is configured to communicate a permission to the mobile station to attempt to identify a cell of the first RAT in the absence of communicating to the mobile station a first radio access type neighbour cell list for a serving cell of the second RAT.

In still another embodiment, a device, method, and a program on a computer readable medium are provided for granting a mobile station permission to attempt to identify a cell of a first radio access technology (RAT) while being served by a cell of a second RAT. The mobile station receives a list of neighbour cells of the second RAT. The list contains at least one identifying characteristic associated with at least one cell of the first RAT. The mobile station identifies a cell of the first RAT associated with the at least one identifying characteristic.

In a further embodiment, a device, method, and program on a computer readable medium are provided with respect to a mobile station incapable of communicating via a first radio access technology (RAT) and capable of communicating via a second radio access technology (RAT). A component is configured to receive a list of neighbour cells of the second RAT. The list contains at least one identifying characteristic associated with at least one cell of the first RAT. A component is configured to determine that the at least one identifying characteristic is associated with at least one cell of the first RAT.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile station comprising:
    a component configured to receive via a second radio access technology (RAT) a list of neighbour cells of the second RAT, the list containing at least one entry associated both with another cell of the second RAT and with at least one cell of a first RAT;
    a component configured to determine that the at least one list entry is associated with the at least one cell of the first RAT, wherein the mobile station is incapable of communicating via the first RAT; and
    a component configured to refrain from searching for the another cell of the second RAT associated with the at least one list entry when the at least one list entry is also associated with the at least one cell of the first RAT.

2. The mobile station of claim 1, wherein an access node has configured the mobile station via communications with the mobile station.

3. The mobile station of claim 1, wherein the first RAT comprises an evolved universal terrestrial radio access network (E-UTRAN).

4. The mobile station of claim 1, wherein the second RAT comprises one of a universal terrestrial radio access network (UTRAN) and a GSM/EDGE radio access network (GERAN).

5. The mobile station of claim 4, wherein the at least one list entry comprises at least one of a GERAN broadcast control channel (BCCH) absolute radio frequency channel number (ARFCN), a UTRAN frequency, and a UTRAN frequency plus a primary scrambling code.

6. An access node for communicating with a mobile station, the access node comprising:
    a component configured to configure the mobile station via communications of a second radio access technology (RAT) with the mobile station to at least one of:
    determine that at least one entry of a list of neighbour cells of the second RAT corresponding to another cell of the second RAT is also associated with at least one cell of a first RAT, wherein the mobile station is incapable of communicating via the first RAT, and
    refrain from searching for the another cell of the second RAT also associated with the at least one list entry.

7. The access node of claim 6, wherein the first RAT comprises an evolved universal terrestrial radio access network (E-UTRAN).

8. The access node of claim 6, wherein the second RAT comprises one of a universal terrestrial radio access network (UTRAN) and a GSM/EDGE radio access network (GERAN).

9. The access node of claim 8, wherein the at least one list entry comprises at least one of a GERAN broadcast control channel (BCCH) absolute radio frequency channel number (ARFCN), a UTRAN frequency, and a UTRAN frequency plus a primary scrambling code.

* * * * *